US011770268B2

(12) United States Patent
K M et al.

(10) Patent No.: US 11,770,268 B2
(45) Date of Patent: Sep. 26, 2023

(54) ENHANCED NOTIFICATIONS FOR ONLINE COLLABORATION APPLICATIONS

(71) Applicant: Intel Corporation, Santa Clara, CA (US)

(72) Inventors: Kumar K M, Bangalore (IN); Mukesh Arora, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/670,820

(22) Filed: Feb. 14, 2022

(65) Prior Publication Data

US 2022/0166641 A1 May 26, 2022

(51) Int. Cl.
*H04L 12/18* (2006.01)
*G10L 15/08* (2006.01)
*G10L 15/00* (2013.01)
*G06Q 10/10* (2023.01)

(52) U.S. Cl.
CPC ........ *H04L 12/1859* (2013.01); *G10L 15/005* (2013.01); *G06Q 10/103* (2013.01); *G10L 2015/088* (2013.01)

(58) Field of Classification Search
CPC ............... H04L 12/1859; G10L 15/005; G10L 2015/088; G06Q 10/103
USPC .......................................................... 709/206
See application file for complete search history.

(56) References Cited

U.S. PATENT DOCUMENTS

| | | | | |
|---|---|---|---|---|
| 10,140,986 B2 * | 11/2018 | Froelich | ................. | G10L 15/22 |
| 10,554,931 B1 * | 2/2020 | Zavesky | .......... | H04N 21/42204 |
| 10,904,631 B2 * | 1/2021 | Fels | ..................... | H04N 21/475 |
| 10,970,843 B1 * | 4/2021 | Olsen | ................. | H04N 21/4316 |
| 11,024,291 B2 * | 6/2021 | Castan Lavilla | ....... | G10L 25/51 |
| 11,094,324 B2 * | 8/2021 | Ji | ............................ | G10L 15/30 |
| 11,295,069 B2 * | 4/2022 | Helmbro | ............. | G06F 16/7844 |
| 11,295,739 B2 * | 4/2022 | Li | .......................... | G10L 15/063 |
| 11,308,978 B2 * | 4/2022 | Ravindran | .............. | G10L 15/30 |
| 11,405,225 B1 * | 8/2022 | Bansal | ................... | G06Q 10/10 |
| 11,450,312 B2 * | 9/2022 | Lin | ......................... | G10L 15/02 |
| 11,463,772 B1 * | 10/2022 | Wanjari | ............. | H04N 21/4394 |
| 11,482,224 B2 * | 10/2022 | Smith | ................... | G10L 15/083 |
| 11,482,978 B2 * | 10/2022 | Fish | ....................... | G06F 9/542 |

(Continued)

FOREIGN PATENT DOCUMENTS

| | | | | |
|---|---|---|---|---|
| CN | 104246750 A | * | 12/2014 | ........... G06F 16/685 |
| CN | 104850543 A | * | 8/2015 | ......... G06F 17/2872 |

(Continued)

*Primary Examiner* — Melvin H Pollack
(74) *Attorney, Agent, or Firm* — Eversheds Sutherland (US) LLP

(57) ABSTRACT

This disclosure describes systems, methods, and devices related to smart notifications for online collaboration applications. A method may include receiving, by at least one processor of a device, audio data from an audio stream presented using a video application of the device; identifying, by the at least one processor, a keyword for which to search in the audio data; determining, by the at least one processor, that the audio data includes a representation of the keyword; generating, by the at least one processor, based on the determination that the audio data includes the representation of the keyword, a notification indicating that the keyword was identified in the audio data; and causing presentation, by the at least one processor, of the notification using the device.

20 Claims, 5 Drawing Sheets

(56) References Cited

U.S. PATENT DOCUMENTS

| | | | | |
|---|---|---|---|---|
| 11,483,170 | B1* | 10/2022 | Carbune | H04L 12/1822 |
| 11,495,235 | B2* | 11/2022 | Fujimura | G06N 3/08 |
| 11,521,604 | B2* | 12/2022 | Kracun | G10L 15/16 |
| 11,532,306 | B2* | 12/2022 | Kim | G10L 15/22 |
| 11,545,146 | B2* | 1/2023 | Ren | G10L 15/08 |
| 11,556,307 | B2* | 1/2023 | Maury | G10L 17/02 |
| 2014/0365213 | A1* | 12/2014 | Totzke | G10L 15/22 704/235 |
| 2017/0263265 | A1* | 9/2017 | Ashikawa | G06F 16/345 |
| 2019/0122766 | A1* | 4/2019 | Strader | G06F 16/3344 |
| 2019/0189117 | A1* | 6/2019 | Kumar | G06F 16/3329 |
| 2019/0341050 | A1* | 11/2019 | Diamant | G06V 40/172 |
| 2019/0378076 | A1* | 12/2019 | O'Gorman | H04M 3/56 |
| 2020/0135005 | A1* | 4/2020 | Katz | G06F 3/0486 |
| 2020/0160278 | A1* | 5/2020 | Allen | G06Q 10/1095 |
| 2020/0243094 | A1* | 7/2020 | Thomson | H04M 3/42382 |
| 2020/0279567 | A1* | 9/2020 | Adlersberg | G06F 40/35 |
| 2021/0074270 | A1* | 3/2021 | Ahn | G06N 3/08 |
| 2021/0176429 | A1* | 6/2021 | Peters | G06V 20/41 |
| 2021/0399911 | A1* | 12/2021 | Jorasch | H04L 65/403 |
| 2021/0407520 | A1* | 12/2021 | Neckermann | H04L 12/1831 |
| 2022/0006661 | A1* | 1/2022 | Rathod | H04L 12/1818 |
| 2022/0028412 | A1* | 1/2022 | Aher | G10L 15/1822 |
| 2022/0179595 | A1* | 6/2022 | Thangaraj | G06F 40/30 |
| 2022/0207489 | A1* | 6/2022 | Gupta | H04N 7/15 |
| 2022/0246145 | A1* | 8/2022 | Lum | H04L 12/1827 |
| 2022/0293096 | A1* | 9/2022 | Mohapatra | G06F 40/279 |
| 2022/0353468 | A1* | 11/2022 | Walia | H04N 7/155 |
| 2022/0382907 | A1* | 12/2022 | Siohan | G06F 21/6254 |
| 2022/0408059 | A1* | 12/2022 | Stonehocker | G10L 25/57 |
| 2022/0415327 | A1* | 12/2022 | Fowers | G10L 15/26 |
| 2022/0417364 | A1* | 12/2022 | Engi | H04M 3/568 |
| 2023/0004713 | A1* | 1/2023 | Broussard | G06F 40/274 |
| 2023/0005487 | A1* | 1/2023 | Emmanuel | G10L 17/14 |

FOREIGN PATENT DOCUMENTS

| | | | | |
|---|---|---|---|---|
| KR | 102270132 | B1* | 8/2017 | G10L 15/26 |
| WO | WO-2015037073 | A1* | 3/2015 | G06F 16/00 |
| WO | WO-2018141144 | A1* | 8/2018 | G06F 17/24 |

* cited by examiner

ENHANCED NOTIFICATIONS FOR ONLINE COLLABORATION APPLICATIONS

TECHNICAL FIELD

This disclosure generally relates to systems and methods for video presentation and, more particularly, to smart notifications for online collaboration applications.

BACKGROUND

Users increasingly are using online video conferencing applications to collaborate with other users. During a video collaboration session with multiple users, one user may not pay attention to a portion of the session and may miss important information being presented.

DETAILED DESCRIPTION

Figure 1:
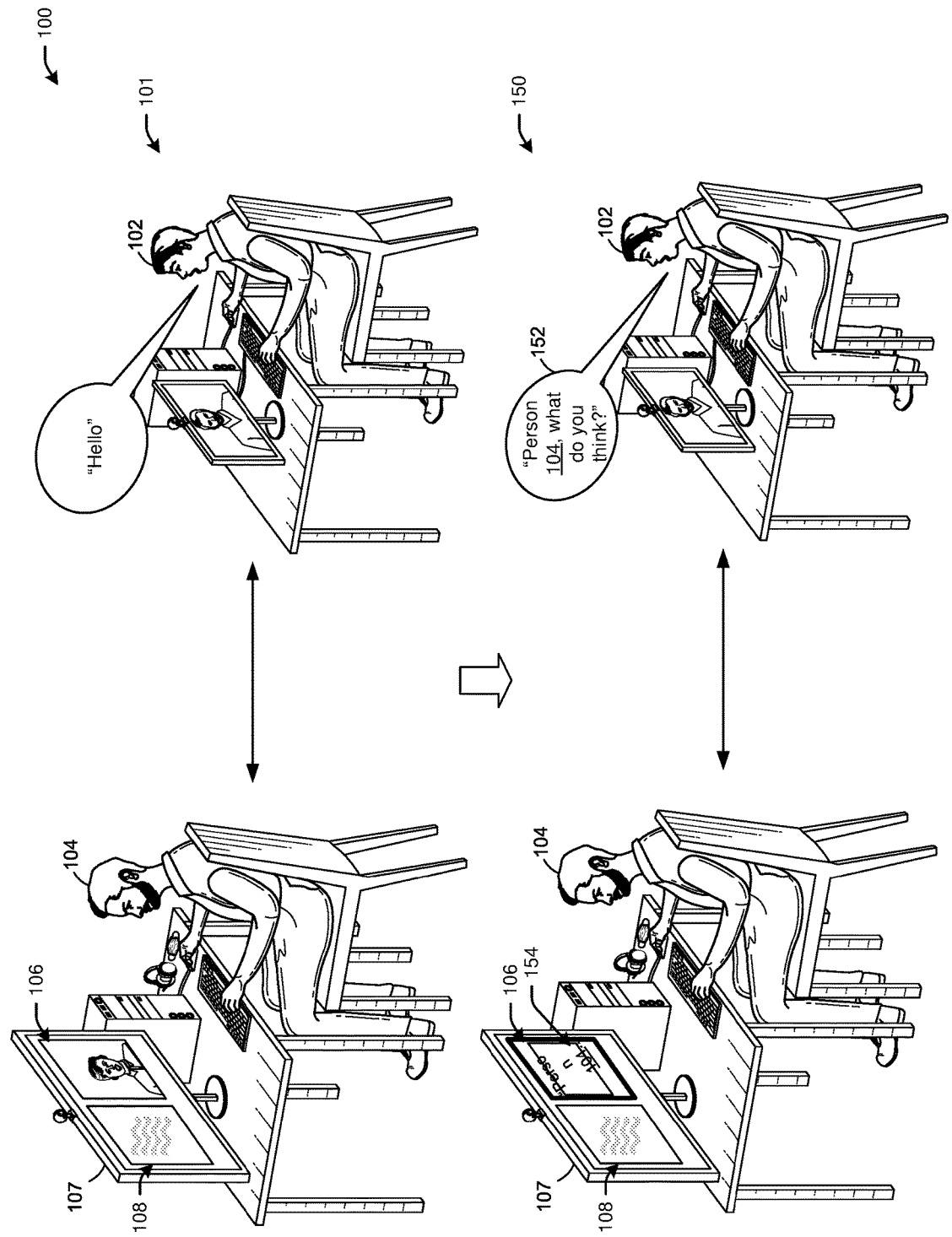
FIG. 1 illustrates an example system for enhanced notifications for online collaboration applications, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

During conference calls and other online collaboration sessions (e.g., video meetings, chat sessions, etc.), it is common for users to not be actively engaged all the time in the conversations. For example, users may focus on something else simultaneously (e.g., reading emails, etc.), the topic being discussed in the meeting is of less importance to the user, a user's active slot in the meeting (e.g., the user's turn to speak/present) is during another part of the call, a user is interested in a specific part of the meeting only, etc. In these scenarios, the user may miss the important part of the meeting in which he/she was actually interested.

In one or more embodiments, a smart notification may allow users to register keywords that he/she is interested in, like his/her name, names of any other participants in the call, domain name, topics, or any other keywords. The present disclosure would notify the users whenever any of the registered keyword is discussed in the meeting. Alternatively or in addition, the keywords may be pre-generated (e.g., recommended) to a user without user input, such as by identifying a user's name, a topic of an online session (e.g., based on a meeting invitation, etc.), identification of names of other parties in an online session, or the like. Alternatively or in addition, the keywords may be provided from another application. The keywords may be compared to a stream of audio data from the online session to identify when the keywords are spoken or otherwise communicated, resulting in generation and presentation of a notification for the user to indicate which keywords were presented.

In one or more embodiments, the comparison of the audio data to the keywords and the generation of notifications may be performed locally on a user's client device (e.g., rather than sending the audio data and keywords remotely to another device, such as a server, for analysis). In this manner, the analysis may be faster and more secure, allowing for real-time notifications to prevent a user from missing desirable portions of online sessions, and avoiding privacy issues that may occur when sending the audio data and keywords elsewhere for analysis.

In one or more embodiments, the analysis and generation of the notifications may occur outside of the application that provides the online video session (e.g., outside of a video conferencing application). In this manner, the system on a client device may generate notifications provide the notifications to the video application for presentation to the user (e.g., via the video application), or may be presented using another application or resource of the system operating the application.

In one or more embodiments, to perform the analysis and generation of notifications locally, a client device executing a video conferencing or other video session application may include hardware with a notification gateway and a low-power speech recognition accelerator (e.g., a Gaussian neural accelerator or another accelerator for speech analysis). For example, a core processor of the client device may include a notification gateway that receives audio data (e.g., an audio stream) from the video application (e.g., audio of people talking in a conference call, and/or any other audio in the video stream presented by the video application). The notification gateway also may receive user inputs including keywords to be detected in the audio data. The notification gateway may provide the keywords and the audio data to the speech recognition accelerator, which may use speech recognition techniques on the audio data to identify the presence of the keywords (e.g., to detect when the audio data includes the keywords, indicating that the keywords were spoken or otherwise communicated in a video session using the video application). When a keyword is detected, the speech recognition accelerator may generate and provide a notification of the identified keyword to the notification gateway, which may provide the notification to the video application or may provide the notification to another resource (e.g., a different application on the device) for presentation to the user of the device.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 illustrates an example system 100 for enhanced notifications for online collaboration applications, in accordance with one or more example embodiments of the present disclosure.

Referring to FIG. 1, the system 100, at step 101, may include a person 102 communicating with a person 104 (e.g., using a video conferencing application 106 presented using device 107). The person 104 may be focused on something else (e.g., another application 108) during a video conference provided by the video conferencing application 106, which may provide video data and audio data, such as voices of other participants talking, video of other participants, documents, graphics, and the like. At step 150, the person 102 may utter 152 a keyword (e.g., as specified by the person 104 or otherwise selected), such as the name of the person 104. In response, the person 104 may be presented with (e.g., using the device 107) a notification 154 that indicates to the person 104 that a keyword has been uttered by another person in the video conference. The notification 154 may include an indication of the keyword uttered, the person who uttered the keyword, and/or the context in which the keyword was uttered (e.g., text of a sentence in which the keyword was uttered, the time at which the keyword was uttered, etc.).

In one or more embodiments, the notification 154 may be a smart notification based on registered keywords provided by and/or approved by the person 104, like his/her name, names of any other participants in the call, domain name, topics, or any other keywords. Alternatively or in addition, the keywords may be pre-generated (e.g., recommended) to a user without user input, such as by identifying a user's name, a topic of an online session (e.g., based on a meeting invitation, etc.), identification of names of other parties in an online session, or the like. Alternatively or in addition, the keywords may be provided from another application (e.g., the application 108). The keywords may be compared to a stream of audio data from the online session of the video conferencing application 106 to identify when the keywords are spoken or otherwise communicated, resulting in generation and presentation of the notification 154 to the person 104 to indicate which keywords were presented.

In one or more embodiments, the comparison of the audio data to the keywords and the generation of notifications may be performed locally on a user's client device (e.g., the device 107). In this manner, the analysis may be faster and more secure, allowing for real-time notifications to prevent a user from missing desirable portions of online sessions, and avoiding privacy issues that may occur when sending the audio data and keywords elsewhere for analysis.

In one or more embodiments, the analysis and generation of the notifications may occur outside of the video conferencing application 106 that provides the online video session (e.g., outside of a video conferencing application). In this manner, the device 107 may generate notifications and provide the notifications to the video conferencing application 106 for presentation to the person 104, or may be presented using another application or resource of the system operating the video conferencing application 106.

In one or more embodiments, the notification 154 may cause the person 104 to re-engage with the video conferencing application 106 by speaking, listening, and/or interacting with the video conferencing application 106. The process may be repeated for multiple keywords. For example, step 150 may be repeated as the same or other keywords are identified from the audio data of the video conferencing application 106.

Figure 2:
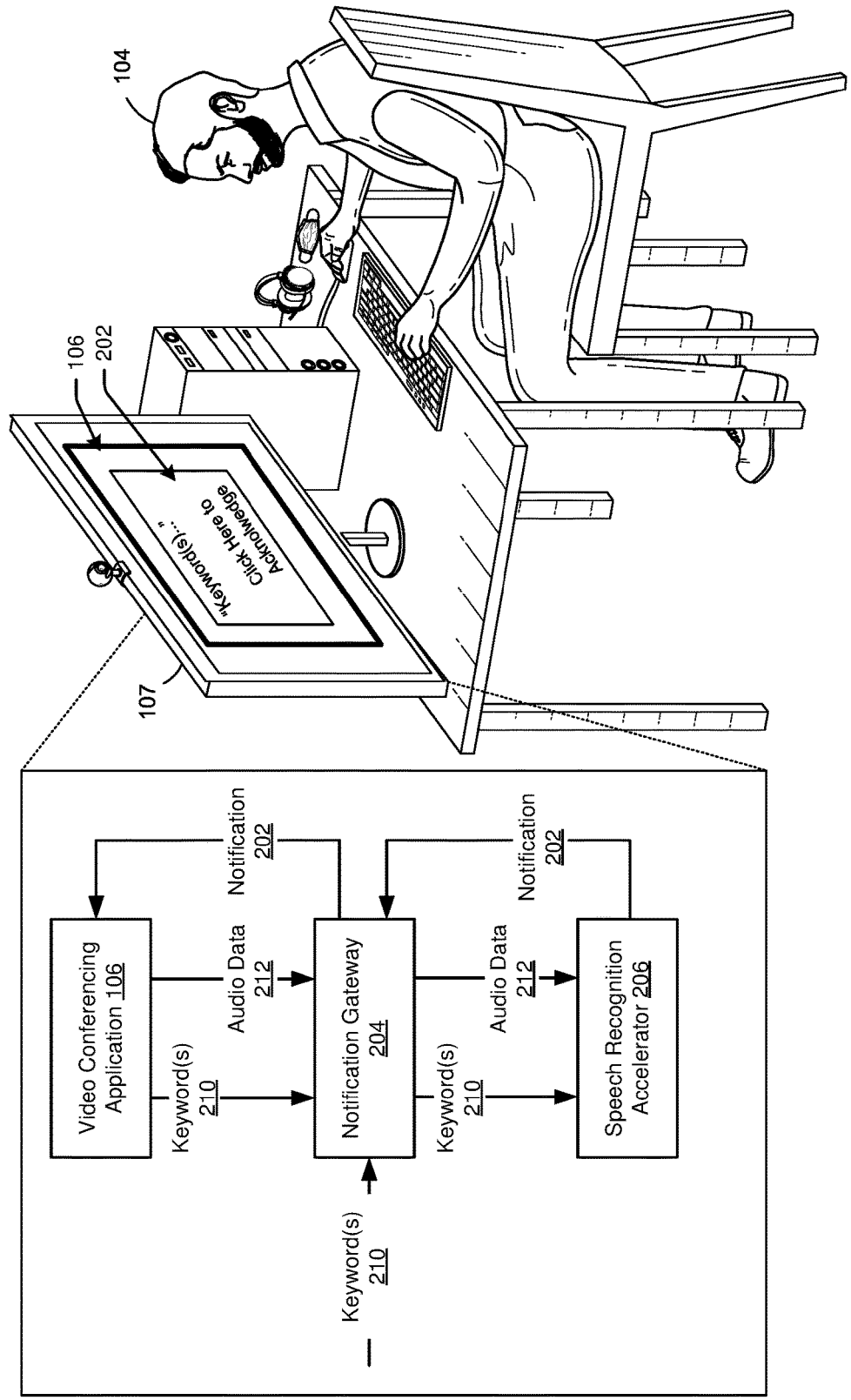
FIG. 2 illustrates an example notification for online collaboration applications, in accordance with one or more example embodiments of the present disclosure.

FIG. 2 illustrates an example notification for online collaboration applications, in accordance with one or more example embodiments of the present disclosure.

Referring to FIG. 2, the person 104 may use the video conferencing application 106 with the device 107 of FIG. 1. As shown, a notification 202 that indicates that one or more keywords were mentioned (e.g., by another participant, such as the person 102 of FIG. 1) may include the one or more keywords and a request for the person 104 to acknowledge the presentation of the keywords (e.g., a requirement for the person 104 to click an acknowledgement to indicate that the person 104 heard and/or saw the notification 202). As shown, the notification 202 may be presented using the video conferencing application 106.

Still referring to FIG. 2, the device 107 may include the video conferencing application 106, a notification gateway 204, and a speech recognition accelerator 206. Keywords 210 may be input by the person 104 and/or pre-generated, and may be input to the video conferencing application 106 and/or the notification gateway 204. The video conferencing application 106 may provide audio data 212 (e.g., the audio from a video conference session presented by the video conferencing application 106) to the notification gateway 204, which may provide the keywords 210 and the audio data 212 to the speech recognition accelerator 206. The speech recognition accelerator 206 may convert the audio data 212 to text using speech-to-text techniques, for example, and may analyze the text to identify the presence of the keywords 210. When any of the keywords 210 are identified in the audio data 212, the speech recognition accelerator 206 may generate the notification 202 for the notification gateway 204, which may provide the notification 202 to the video conferencing application 106 for presentation as shown in FIG. 2.

Figure 3:
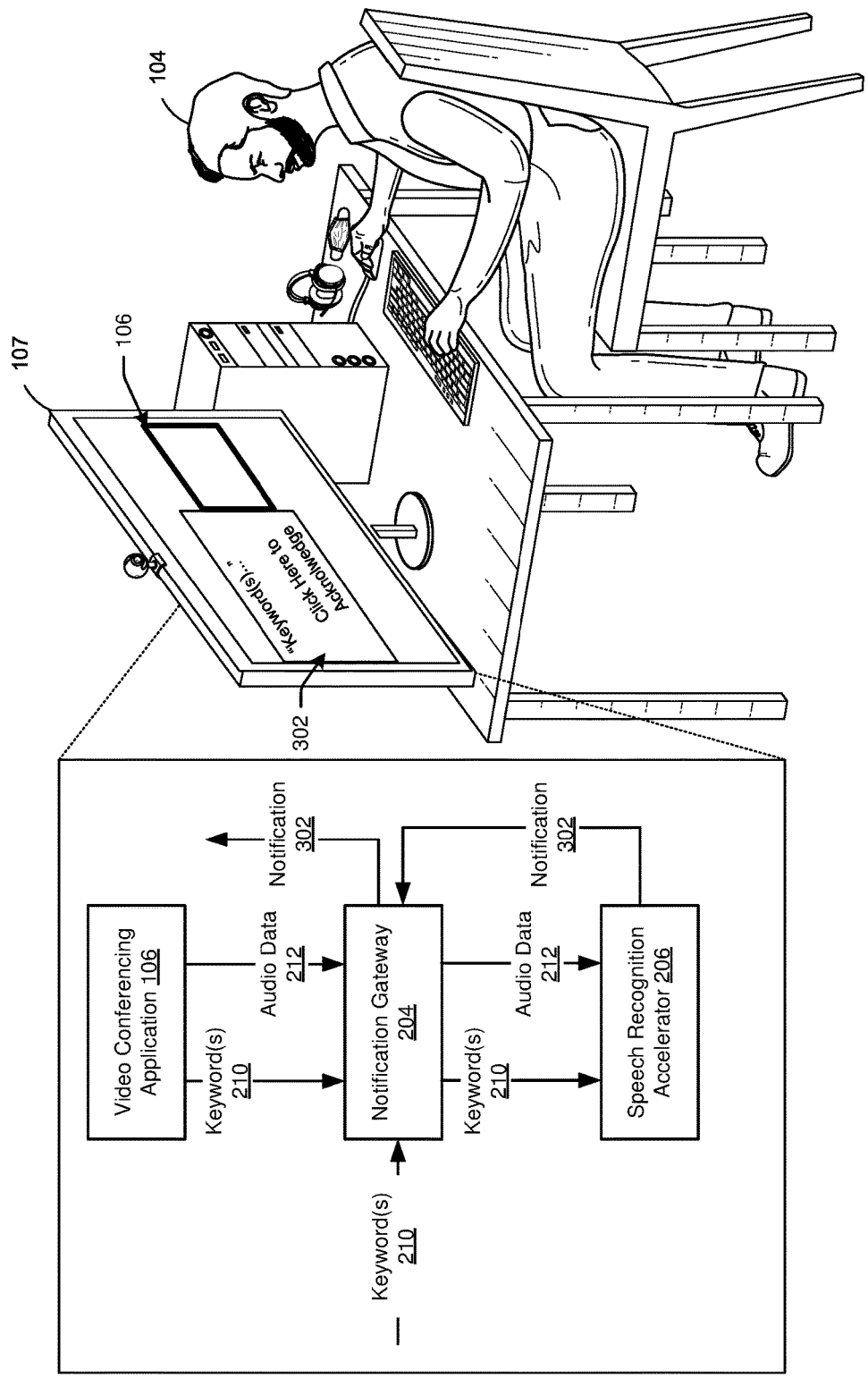
FIG. 3 illustrates an example notification for online collaboration applications, in accordance with one or more example embodiments of the present disclosure.

FIG. 3 illustrates an example notification for online collaboration applications, in accordance with one or more example embodiments of the present disclosure.

Referring to FIG. 3, the person 104 may use the video conferencing application 106 with the device 107 of FIG. 1. As shown, a notification 302 that indicates that one or more keywords were mentioned (e.g., by another participant, such as the person 102 of FIG. 1) may include the one or more keywords and a request for the person 104 to acknowledge the presentation of the keywords (e.g., a requirement for the person 104 to click an acknowledgement to indicate that the person 104 heard and/or saw the notification 302). As shown, the notification 302 may be presented outside of the video conferencing application 106.

Still referring to FIG. 3, the device 107 may include the video conferencing application 106, the notification gateway 204, and the speech recognition accelerator 206 of FIG. 2. Keywords 210 may be input by the person 104 and/or pre-generated, and may be input to the video conferencing application 106 and/or the notification gateway 204. The video conferencing application 106 may provide audio data 212 (e.g., the audio from a video conference session presented by the video conferencing application 106) to the notification gateway 204, which may provide the keywords 210 and the audio data 212 to the speech recognition accelerator 206. The speech recognition accelerator 206 may convert the audio data 212 to text using speech-to-text techniques, for example, and may analyze the text to identify the presence of the keywords 210. When any of the keywords 210 are identified in the audio data 212, the speech recognition accelerator 206 may generate the notification 302 for the notification gateway 204, which may provide the notification 302 for presentation as shown in FIG. 3.

Figure 4:
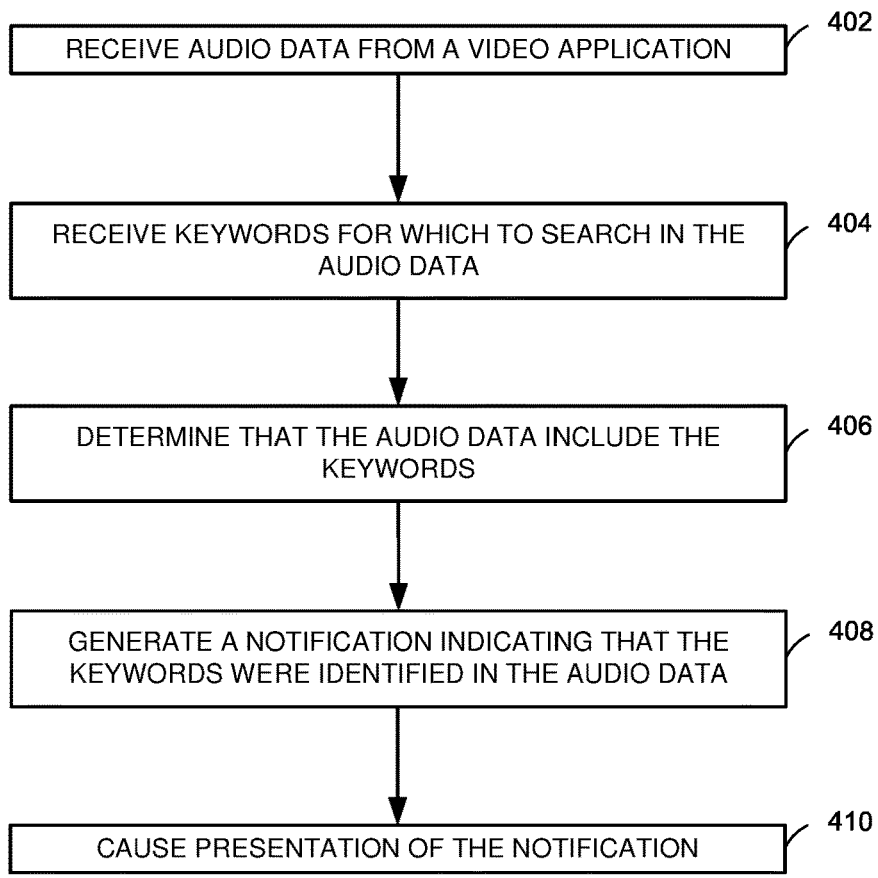
FIG. 4 illustrates a flow diagram of illustrative process for enhanced notifications for online collaboration applications, in accordance with one or more example embodiments of the present disclosure.

FIG. 4 illustrates a flow diagram of illustrative process 400 for enhanced notifications for online collaboration applications, in accordance with one or more example embodiments of the present disclosure.

At block 402, a device (e.g., the notification device 519 of FIG. 5) may receive audio data (e.g., the audio data 212 of FIG. 2 and FIG. 3) from a video application (e.g., the video conferencing application 106 of FIGS. 1-3) executing using a client device (e.g., the device 107 of FIGS. 1-3) that includes the device. The audio data may be from an audio stream presented using the video application, such as a virtual meeting or other video conferencing session including multiple users.

At block 404, the device may receive keywords for which to search in the audio data. In one or more embodiments, a smart notification may allow users to register keywords that he/she is interested in, like his/her name, names of any other participants in the call, domain name, topics, or any other keywords. Alternatively or in addition, the keywords may be pre-generated (e.g., recommended) to a user without user input, such as by identifying a user's name, a topic of an online session (e.g., based on a meeting invitation, etc.), identification of names of other parties in an online session, or the like. Alternatively or in addition, the keywords may be provided from another application. The keywords may be compared to a stream of audio data from the online session to identify when the keywords are spoken or otherwise communicated, resulting in generation and presentation of a notification for the user to indicate which keywords were presented.

At block 406, the device may determine that the audio data include the keywords. For example, using the speech recognition accelerator 206 of FIGS. 2 and 3, the device may identify the keywords in one or more portions of the audio data in real time. For example, at a first time, a first keyword may be identified in a sentence of the audio data. At a second time, a second keyword may be identified in another sentence of the audio data. The analysis may occur in real time, so the audio data may continue to be received from the video conferencing application as the video conferencing application receives the audio stream. In this manner, the analysis may include portions of the audio data (e.g., a few seconds at a time, a sentence at a time, word-by-word, or the like), so that when a keyword is identified in the audio data, a user may be notified immediately without having to wait for further analysis of subsequent audio data from the audio stream.

At block 408, the device may generate a notification (e.g., the notification 154 of FIG. 1, the notification 202 of FIG. 2, the notification 302 of FIG. 3) indicating that the keyword was identified in the audio data. The notification may include the identified keyword(s), one or more additional words (e.g., a sentence in which the keyword was identified), the time when the keyword was identified, the user who communicated the keyword, and the like.

At block 410, the device may cause presentation of the notification, either by sending the notification to the video conferencing application or to another computer resource (e.g., a different computer application) for presentation (e.g., as shown in FIGS. 1-3).

The examples herein are not meant to be limiting.

Figure 5:
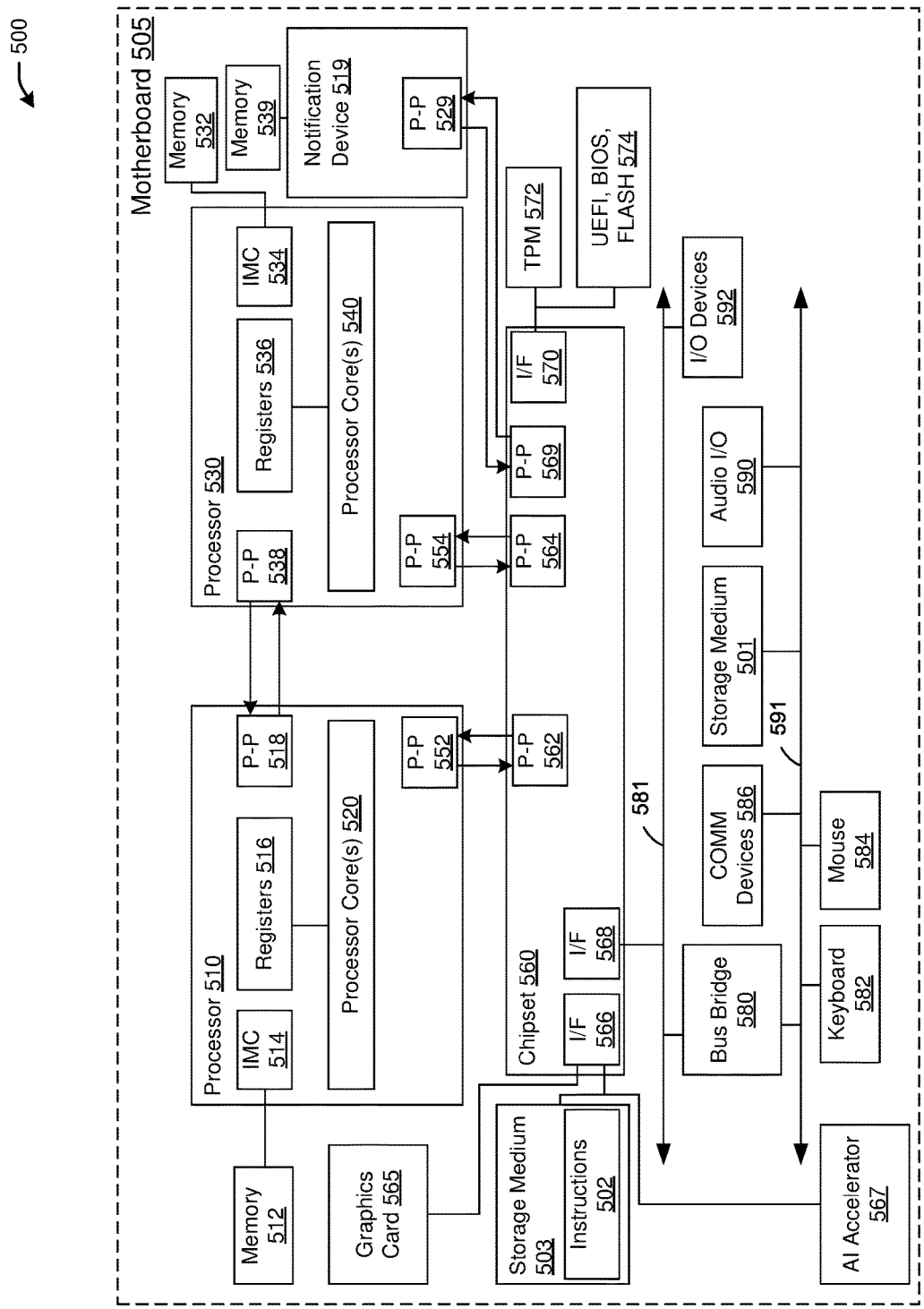
FIG. 5 is a block diagram illustrating components, in accordance with one or more example embodiments of the present disclosure.

FIG. 5 illustrates an embodiment of an exemplary system 500, in accordance with one or more example embodiments of the present disclosure.

In various embodiments, the computing system 500 may comprise or be implemented as part of an electronic device.

In some embodiments, the computing system 500 may be representative, for example, of a computer system that implements one or more components of FIG. 1.

The embodiments are not limited in this context. More generally, the computing system 500 is configured to implement all logic, systems, processes, logic flows, methods, equations, apparatuses, and functionality described herein and with reference to FIGS. 1-6.

The system 500 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, a handheld device such as a personal digital assistant (PDA), or other devices for processing, displaying, or transmitting information. Similar embodiments may comprise, e.g., entertainment devices such as a portable music player or a portable video player, a smart phone or other cellular phones, a telephone, a digital video camera, a digital still camera, an external storage device, or the like. Further embodiments implement larger scale server configurations. In other embodiments, the system 500 may have a single processor with one core or more than one processor. Note that the term "processor" refers to a processor with a single core or a processor package with multiple processor cores.

In at least one embodiment, the computing system 500 is representative of one or more components of FIG. 1. More generally, the computing system 500 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 500. For example, a component can be, but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 500 comprises a motherboard 505 for mounting platform components. The motherboard 505 is a point-to-point interconnect platform that includes a processor 510, a processor 530 coupled via a point-to-point interconnects as an Ultra Path Interconnect (UPI), and a notification device 519 (e.g., representing any of the components and functionality of the device 107 of FIGS. 1-3, and capable of performing the process 400 of FIG. 4). In other embodiments, the system 500 may be of another bus architecture, such as a multi-drop bus. Furthermore, each of processors 510 and 530 may be processor packages with multiple processor cores. As an example, processors 510 and 530 are shown to include processor core(s) 520 and 540, respectively. While the system 500 is an example of a two-socket (2S) platform, other embodiments may include more than two sockets or one socket. For example, some embodiments may include a four-socket (4S)

platform or an eight-socket (8S) platform. Each socket is a mount for a processor and may have a socket identifier. Note that the term platform refers to the motherboard with certain components mounted such as the processors 510 and the chipset 560. Some platforms may include additional components and some platforms may only include sockets to mount the processors and/or the chipset.

The processors 510 and 530 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 510, and 530.

The processor 510 includes an integrated memory controller (IMC) 514 and point-to-point (P-P) interfaces 518 and 552. Similarly, the processor 530 includes an IMC 534 and P-P interfaces 538 and 554. The IMC's 514 and 534 couple the processors 510 and 530, respectively, to respective memories, a memory 512 and a memory 532. The memories 512 and 532 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 512 and 532 locally attach to the respective processors 510 and 530.

In addition to the processors 510 and 530, the system 500 may include a notification device 519. The notification device 519 may be connected to chipset 560 by means of P-P interfaces 529 and 569. The notification device 519 may also be connected to a memory 539. In some embodiments, the notification device 519 may be connected to at least one of the processors 510 and 530. In other embodiments, the memories 512, 532, and 539 may couple with the processor 510 and 530, and the notification device 519 via a bus and shared memory hub.

System 500 includes chipset 560 coupled to processors 510 and 530. Furthermore, chipset 560 can be coupled to storage medium 503, for example, via an interface (I/F) 566. The I/F 566 may be, for example, a Peripheral Component Interconnect-enhanced (PCI-e). The processors 510, 530, and the notification device 519 may access the storage medium 503 through chipset 560.

Storage medium 503 may comprise any non-transitory computer-readable storage medium or machine-readable storage medium, such as an optical, magnetic or semiconductor storage medium. In various embodiments, storage medium 503 may comprise an article of manufacture. In some embodiments, storage medium 503 may store computer-executable instructions, such as computer-executable instructions 502 to implement one or more of processes or operations described herein, (e.g., process 400 of FIG. 4). The storage medium 503 may store computer-executable instructions for any equations depicted above. The storage medium 503 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 510 couples to a chipset 560 via P-P interfaces 552 and 562 and the processor 530 couples to a chipset 560 via P-P interfaces 554 and 564. Direct Media Interfaces (DMIs) may couple the P-P interfaces 552 and 562 and the P-P interfaces 554 and 564, respectively. The DMI may be a high-speed interconnect that facilitates, e.g., eight Giga Transfers per second (GT/s) such as DMI 3.0. In other embodiments, the processors 510 and 530 may interconnect via a bus.

The chipset 560 may comprise a controller hub such as a platform controller hub (PCH). The chipset 560 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 560 may comprise more than one controller hub such as a chipset with a memory controller hub, a graphics controller hub, and an input/output (I/O) controller hub.

In the present embodiment, the chipset 560 couples with a trusted platform module (TPM) 572 and the UEFI, BIOS, Flash component 574 via an interface (I/F) 570. The TPM 572 is a dedicated microcontroller designed to secure hardware by integrating cryptographic keys into devices. The UEFI, BIOS, Flash component 574 may provide pre-boot code.

Furthermore, chipset 560 includes the I/F 566 to couple chipset 560 with a high-performance graphics engine, graphics card 565. In other embodiments, the system 500 may include a flexible display interface (FDI) between the processors 510 and 530 and the chipset 560. The FDI interconnects a graphics processor core in a processor with the chipset 560.

Various I/O devices 592 couple to the bus 581, along with a bus bridge 580 which couples the bus 581 to a second bus 591 and an I/F 568 that connects the bus 581 with the chipset 560. In one embodiment, the second bus 591 may be a low pin count (LPC) bus. Various devices may couple to the second bus 591 including, for example, a keyboard 582, a mouse 584, communication devices 586, a storage medium 501, and an audio I/O 590.

The artificial intelligence (AI) accelerator 567 may be circuitry arranged to perform computations related to AI. The AI accelerator 567 may be connected to storage medium 503 and chipset 560. The AI accelerator 567 may deliver the processing power and energy efficiency needed to enable abundant-data computing. The AI accelerator 567 is a class of specialized hardware accelerators or computer systems designed to accelerate artificial intelligence and machine learning applications, including artificial neural networks and machine vision. The AI accelerator 567 may be applicable to algorithms for robotics, internet of things, other data-intensive and/or sensor-driven tasks.

Many of the I/O devices 592, communication devices 586, and the storage medium 501 may reside on the motherboard 505 while the keyboard 582 and the mouse 584 may be add-on peripherals. In other embodiments, some or all the I/O devices 592, communication devices 586, and the storage medium 501 are add-on peripherals and do not reside on the motherboard 505.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Example 1 may be a method for presenting video conferencing notifications during video conferences, the method comprising: receiving, by at least one processor of a device, audio data from an audio stream presented using a video application of the device; identifying, by the at least one processor, a keyword for which to search in the audio data; determining, by the at least one processor, that the audio data comprise a representation of the keyword; generating, by the at least one processor, based on the determination that the audio data comprise the representation of the keyword, a notification indicating that the keyword was identified in the audio data; and causing presentation, by the at least one processor, of the notification using the device.

Example 2 may include the method of example 1 and/or some other example herein, further comprising: receiving a user input from a user of the video application and the device, wherein the user input comprises the keyword.

Example 3 may include the method of example 1 and/or some other example herein, further comprising: generating, automatically, the keyword based on context associated with the video application.

Example 4 may include the method of example 3 and/or some other example herein, wherein the context comprises at least one of a user name or a topic associated with a session using the video application.

Example 5 may include the method of example 1 and/or some other example herein, wherein the notification is presented using the video application, and wherein causing presentation of the notification comprises sending the notification to the video application for presentation.

Example 6 may include the method of example 1 and/or some other example herein, wherein the notification is presented using an application different than the video application, wherein causing presentation of the notification comprises sending the notification to the application for presentation.

Example 7 may include the method of example 1 and/or some other example herein, wherein the notification comprises the keyword at least a portion of a sentence in which the keyword was communicated in the audio data.

Example 8 may include the method of example 1 and/or some other example herein, wherein the notification comprises a selectable acknowledgement querying a user of the device to acknowledge presentation of the notification.

Example 9 may include a computer-readable storage medium comprising instructions to cause processing circuitry of a client device, upon execution of the instructions by the processing circuitry, to: receive audio data from an audio stream presented using a video application of the client device; identify a keyword for which to search in the audio data; determine that the audio data comprise a representation of the keyword; generate, based on the determination that the audio data comprise the representation of the keyword, a notification indicating that the keyword was identified in the audio data; and cause presentation of the notification using the client device.

Example 10 may include the computer-readable medium of example 9 and/or some other example herein, wherein the instructions further cause the processing circuitry to: receive a user input from a user of the video application and the client device, wherein the user input comprises the keyword.

Example 11 may include the computer-readable medium of example 9 and/or some other example herein, wherein the instructions further cause the processing circuitry to: generate, automatically, the keyword based on context associated with the video application.

Example 12 may include the computer-readable medium of example 11 and/or some other example herein, wherein the context comprises at least one of a user name or a topic associated with a session using the video application.

Example 13 may include the computer-readable medium of example 9 and/or some other example herein, wherein the notification is presented using the video application, and wherein to cause presentation of the notification comprises to send the notification to the video application for presentation.

Example 14 may include the computer-readable medium of example 9 and/or some other example herein, the operations further comprising: wherein the notification is presented using an application different than the video application, wherein to cause presentation of the notification comprises to send the notification to the application for presentation.

Example 15 may include the computer-readable medium of example 9 and/or some other example herein, wherein the notification comprises the keyword at least a portion of a sentence in which the keyword was communicated in the audio data.

Example 16 may include the computer-readable medium of example 9 and/or some other example herein, wherein the notification comprises a selectable acknowledgement querying a user of the client device to acknowledge presentation of the notification.

Example 17 may include a device for presenting video conferencing notifications during video conferences, the device comprising processing circuitry coupled to memory, the processing circuitry being configured to: receive audio data from an audio stream presented using a video application of the device; identify a keyword for which to search in the audio data; determine that the audio data comprise a representation of the keyword; generate, based on the determination that the audio data comprise the representation of the keyword, a notification indicating that the keyword was identified in the audio data; and cause presentation of the notification using the device.

Example 18 may include the device of example 17 and/or some other example herein, wherein the processing circuitry is further configured to: receive a user input from a user of the video application and the device, wherein the user input comprises the keyword.

Example 19 may include the device of example 17 and/or some other example herein, wherein the processing circuitry is further configured to: generate, automatically, the keyword based on context associated with the video application.

Example 20 may include the device of example 19 and/or some other example herein, wherein the context comprises at least one of a user name or a topic associated with a session using the video application.

Example 21 may include an apparatus comprising means for: receiving audio data from an audio stream presented using a video application of the device; identifying a keyword for which to search in the audio data; determining that the audio data comprise a representation of the keyword; generating, based on the determination that the audio data comprise the representation of the keyword, a notification indicating that the keyword was identified in the audio data; and causing presentation of the notification using the device.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method for presenting video conferencing notifications during video conferences, the method comprising:
   receiving, by at least one processor of a device, audio data from an audio stream presented using a video application of the device;
   identifying, by the at least one processor, a user selection of a keyword for which to search in the audio data;
   identifying, by the at least one processor, words represented in the audio data, wherein the user selection is received prior to identifying the words represented in the audio data;
   determining, by the at least one processor, that the words comprise the keyword;
   generating, by the at least one processor, based on the determination that the words comprise the keyword, a notification indicating that the keyword was identified in the audio data; and
   causing presentation, by the at least one processor, of the notification to a user who provided the user selection.

2. The method of claim 1, wherein the user selection comprises the keyword.

3. The method of claim 1, further comprising:
   generating, automatically, a second keyword, for which to search among the words, based on context associated with the video application.

4. The method of claim 3, wherein the context comprises at least one of a user name or a topic associated with a session using the video application.

5. The method of claim 1, wherein the notification is presented using the video application, and wherein causing presentation of the notification comprises sending the notification to the video application for presentation.

6. The method of claim 1, wherein the notification is presented using an application different than the video application, wherein causing presentation of the notification comprises sending the notification to the application for presentation.

7. The method of claim 1, wherein the notification comprises the keyword at least a portion of a sentence in which the keyword was communicated in the audio data.

8. The method of claim 1, wherein the notification comprises a selectable acknowledgement querying a user of the device to acknowledge presentation of the notification.

9. A computer-readable storage medium comprising instructions to cause processing circuitry of a client device, upon execution of the instructions by the processing circuitry, to:
   receive audio data from an audio stream presented using a video application of the client device;
   identify a user selection of a keyword for which to search in the audio data;
   identify words represented in the audio data, wherein the user selection is received prior to identifying the words represented in the audio data;
   determine that the words comprise of the keyword;
   generate, based on the determination that the words comprise the keyword, a notification indicating that the keyword was identified in the audio data; and
   cause presentation of the notification to a user who provided the user selection.

10. The computer-readable storage medium of claim 9, wherein the user selection input comprises the keyword.

11. The computer-readable storage medium of claim 9, wherein the instructions further cause the processing circuitry to:
   generate, automatically, a second keyword, for which to search among the words, based on context associated with the video application.

12. The computer-readable storage medium of claim 11, wherein the context comprises at least one of a user name or a topic associated with a session using the video application.

13. The computer-readable storage medium of claim 9, wherein the notification is presented using the video application, and wherein to cause presentation of the notification comprises to send the notification to the video application for presentation.

14. The computer-readable storage medium of claim 9, wherein the notification is presented using an application different than the video application, wherein to cause presentation of the notification comprises to send the notification to the application for presentation.

15. The computer-readable storage medium of claim 9, wherein the of a sentence in which the keyword was communicated in the audio data.

16. The computer-readable storage medium of claim 9, wherein the notification comprises a selectable acknowledgement querying a user of the client device to acknowledge presentation of the notification.

17. A device for presenting video conferencing notifications during video conferences, the device comprising processing circuitry coupled to memory, the processing circuitry being configured to:
   receive audio data from an audio stream presented using a video application of the device;
   identify a user selection of a keyword for which to search in the audio data;
   identify words represented in the audio data, wherein the user selection is received prior to identifying the words represented in the audio data;
   determine that the words comprise the keyword;
   generate, based on the determination that the words comprise the keyword, a notification indicating that the keyword was identified in the audio data; and cause presentation of the notification to a user who provided the user selection.

18. The device of claim 17, wherein the user selection comprises the keyword.

19. The device of claim 17, wherein the processing circuitry is further configured to:
generate, automatically, a second keyword, for which to search among the words, based on context associated with the video application.

20. The device of claim 19, wherein the context comprises at least one of a user name or a topic associated with a session using the video application.

* * * * *